United States Patent [19]

Beggs et al.

[11] Patent Number: 5,272,911

[45] Date of Patent: Dec. 28, 1993

[54] CYLINDER HEAD FLOW TEST APPARATUS AND METHOD

[75] Inventors: Orrin P. Beggs, Belvidere; Herbert Meyer, Rockford, both of Ill.

[73] Assignee: Litton Industrial Automation Systems, Inc., Rockford, Ill.

[21] Appl. No.: 966,684

[22] Filed: Oct. 26, 1992

[51] Int. Cl.[5] .............................................. G01M 3/32
[52] U.S. Cl. .................................... 73/49.7; 73/47
[58] Field of Search ................................. 73/49.7, 47

[56] References Cited

U.S. PATENT DOCUMENTS

| | | | |
|---|---|---|---|
| 3,360,984 | 1/1968 | Salsbury et al. | 73/49.7 |
| 3,608,369 | 9/1971 | Wilkinson | 73/49.7 X |
| 3,792,605 | 2/1974 | Rabenau | 73/37.9 |
| 3,793,875 | 2/1974 | Jurkiewicz | 73/37.5 |
| 3,863,492 | 2/1975 | Trask, II | 73/37.5 |
| 3,874,225 | 4/1975 | Fegel | 73/49.7 X |
| 3,973,429 | 8/1976 | Durgan et al. | 73/49.7 |
| 4,019,379 | 4/1977 | Wartelle et al. | 73/37.5 X |
| 4,437,335 | 3/1984 | Gates | 73/37.9 |
| 4,860,575 | 8/1989 | Robinson | 73/49.7 |
| 5,092,161 | 3/1992 | Jenkins et al. | 73/37 |
| 5,095,738 | 3/1992 | Roeschlaub | 73/49.7 |

FOREIGN PATENT DOCUMENTS

| | | | |
|---|---|---|---|
| 638568 | 3/1962 | Canada | 73/49.7 |
| 122551 | 10/1984 | European Pat. Off. | 73/49.7 |
| 38833 | 2/1990 | Japan | 73/49.7 |

Primary Examiner—Hezron E. Williams
Assistant Examiner—Joseph W. Roskos
Attorney, Agent, or Firm—Michael H. Wallach

[57] ABSTRACT

A cylinder head flow test apparatus and method for testing cylinder heads for blockages in water passages wherein blockages in the water passages contained in the cylinder head can be detected by blowing low pressure air at a high velocity into the water passages and measuring the resulting back pressure produced by restrictions within the water passages. The disclosed method and apparatus include means for selectively testing the water passages in a cylinder head and for comparing the back pressure readings obtained from the test to back pressure readings previously obtained from a cylinder head whose water passages are known to have no blockages. An apparatus and method also disclosed for simultaneously testing all water passages in a cylinder head for blockages.

31 Claims, 8 Drawing Sheets

CYLINDER HEAD FLOW TEST APPARATUS AND METHOD

BACKGROUND OF THE INVENTION

1. Field of the Invention

This invention relates to an apparatus and method for testing for blockages in fluid passages in internal combustion engines in general and, in particular, for testing for blockages in cooling passages in cylinder heads for internal combustion engines.

2. Summary of the Prior Art

Recent trends in automotive design have seen the use of smaller internal combustion engines to reduce the overall size of the engine compartment required to house the engine. An additional benefit of smaller internal combustion engines is that the weight of the engine is reduced, thereby achieving improved performance, i.e. acceleration, while achieving greater fuel economy. Contemporary internal combustion engine design has witnessed the trend of operating engines at a higher temperature to improve their fuel efficiency and incorporating multiple valves per cylinder into the engine design to improve the intake of combustion air and the discharge of the products of combustion. Additionally, the trend toward reducing the weight of engines has seen the use of engine components, for example engine blocks and cylinder heads, having thinner castings to reduce unnecessary weight. The trend toward lighter weight castings is particularly evident in the design and manufacture of cylinder and becomes especially critical in cylinder heads designed for engines having more than two valves per cylinder, for example, in cylinder heads with two intake and two exhaust valves per cylinder.

Cylinder blocks and cylinder heads for internal combustion engines are now widely manufactured using a casting process in which a sand mold is used to define passages and other openings in a hot metal (e.g. cast iron) casting. A known problem associated with using sand molds for casting such components is that the mold may be damaged prior to or during the casting process, or may otherwise contain imperfections which replicate themselves in the cast parts. For example, it is common to manufacture a cylinder head using a sand casting process and, if the mold has defects in the areas defining the water passages in the cylinder head, the water passages will contain defects. Such defects may take a form of restrictions within one or more of the water passages which restrict the flow of water and, as a result, cause localized heating within the cylinder head during operation of the engine. It is necessary to incorporate multiple water cooling passages or cavities within a cylinder head designed for operation at high engine temperatures to remove the heat byproduct of combustion which, if allowed to remain within the cylinder head, would cause unacceptable thermal expansion and possible premature failure of the cylinder head or other engine components, for example intake or exhaust valves. More particularly, cylinder heads utilizing two or more intake and exhaust valves per cylinder are manufactured with multiple water passages in the vicinity of each valve to insure that the cylinder head in the vicinity of each of the valves does not distort or buckle from excessive heat. Consequently, the water passages' ability to remove heat from the area of the cylinder head surrounding each valve becomes critical to the reliable operation and longevity of the engine.

Various known methods and apparatus have been used in the past to test the water passages in a cylinder head for blockages. For example, U.S. Pat. No. 3,360,984 discloses a mechanism for testing engine parts such as cylinder heads and the like by the use of a pressurized fluid. In particular, the disclosed apparatus includes a mechanism for supporting the cylinder head or other component under test and for selectively sealing ports on the cylinder head to permit the cylinder head or other component to be pressure tested using a pressurized fluid introduced into the interior cavity of the component undergoing test. While the mechanism disclosed in the '984 patent permits selective sealing of apertures in a component undergoing test to provide for flexibility of testing a variety of components having different orifice configurations, it nevertheless still requires the use of a pressurized fluid source.

U.S. Pat. No. 3,608,369 discloses an engine head test stand to permit applying water under pressure to an engine cylinder head while sealing openings in the engine head to determine the presence of leaks.

U.S. Pat. No. 3,973,429 discloses a test apparatus for engine heads consisting of a means for supplying fluid from a pressurized source into various cavities in a cylinder head and means for selectively sealing various of the ports of the cylinder head to permit fluid under pressure to be forced into selected passages within the cylinder head to test for leakage. The apparatus permits pressure hoses to be connected to selected ports and the sealing of other ports so that passages within the cylinder head can be selectively tested. Cracks are detected in the head by listening for the escape of air and/or observing the escape of water pressurized within the cylinder head by an air supply.

U.S. Pat. No. 4,860,575 discloses an apparatus for testing the heads of an internal combustion engine for fluid tightness by sealing internal cavities in the head under test from the atmosphere and then applying air pressure to the cavities. While the engine head is under pressure, a soapy solution is applied to the head so that leaks of air from within the internal cavities can be detected by visual observation.

U.S. Pat. No. 5,095,738 discloses an internal combustion engine head leak tester which includes a cover for positioning on an engine head to cover coolant passage ports and means for clamping the head cover onto the head to seal the passages. The invention disclosed in the patent provides means for quickly clamping a head cover onto the head for covering coolant passages ports of the head and means for applying fluid under pressure to the coolant passages within the head.

U.S. Pat. No. 3,874,225 discloses an apparatus for pressure testing injector sleeves of diesel engine heads comprising a means for providing a seal to isolate a portion of a cavity of the cylinder head in which the injector sleeve is contained and means for introducing compressed air into the interior of the sleeve. A pressure gauge on the tester detects any leakage past the injector sleeve after a valve is closed to seal the injector sleeve from the compressed air supply. The foregoing prior art can broadly be classified as disclosing either apparatus for facilitating the testing of cylinder heads for leaks by introducing a liquid or gas into the cylinder head after selected ports within the cylinder head have been closed off and observing leakage of the fluid from the cylinder head, or as disclosing apparatus for the selective sealing of cavities within the cylinder head and the introduction of a gas under pressure into the sealedoff cavity for observing the pressure of the gas to detect fluctuations caused by leakage of the gas from the cylinder head. However, each of the disclosed apparatus is deficient in that they require substantial manual intervention in the testing process, and do not disclose a means for efficiently and automatically collecting information on the test process and comparing the cylinder head under test to a cylinder head having known, acceptable characteristics. Consequently, there is a need for an apparatus and a method for testing engine components in general, and cylinder heads in particular for leakage in the water passages or other fluid-carrying passages which will permit the rapid, automatic testing of the component undergoing testing and which will permit the efficient, automatic collection of data for use in automated assembly line operations.

The known prior art is also deficient in that it does not disclose a mechanism which will permit quantitative information concerning restrictions, if any, in water cooling passages of a cylinder head to be gathered, and to compare such information to the physical characteristics of equivalent water passages in a cylinder head known to have no defects in its fluid-carrying passages. Thus, the desirable traits of a water cavity flow test apparatus and method would include the ability of the apparatus to automatically test the cylinder head or other engine component undergoing test by selectively sealing off fluid-carrying passages in the component undergoing test to pinpoint the location of defects within the component, and the automatic collection of data relating to the ability of the passages within the component undergoing test to conduct fluids such as cooling water. A further desirable attribute of such an apparatus would be the ability to compare the data gathered from the object undergoing test to data collected from a known equivalent object having acceptable fluid-carrying passages and to be able to accept or reject the object under test on the basis of a comparison of the data collected for the object undergoing test to data previously collected for a sample of the object known to be defect-free.

SUMMARY OF THE INVENTION

Accordingly, a principal object of the invention is to provide an apparatus for automatically testing engine components, for example cylinder heads, to insure that fluid-carrying passages within the component undergoing test are not blocked or otherwise restricted. Another object of the invention is to provide an apparatus which will compare the results of a flow test on fluid-carrying passages within the component undergoing test to known results obtained from a component having fluid-carrying passages without any defects. Still another object of the invention is to provide an apparatus for testing engine components for defects in fluid-carrying passages without the need to use a liquid during the testing process. Yet another object of the invention is to provide an apparatus which will produce data on the quality of the fluid-carrying passages within an engine component which will permit trends in the quality of the casting used to manufacture a production run of such components to be determined. Another object is to provide an apparatus which will produce information to identify the location of defective fluid-carrying passages within the object undergoing test. A further object of the invention is to provide a method for testing cylinder heads to insure that the water coolant passages in the vicinity of engine intake and exhaust valves do not contain any defects.

The foregoing and other objects and advantages of the invention are achieved by an apparatus having a means for selectively sealing off fluid passages, for example water passages, within the engine component undergoing test. Means are provided for introducing a supply of low pressure air at a high velocity which may be selectively connected to various fluid-carrying passages within the engine component undergoing test. The means for supplying air includes an air supply line and a pitot tube positioned within the supply line to measure the air pressure within the air stream in an air supply line. A pressure transducer having an electrical output is connected to the pitot tube to monitor the back pressure with the supply line. The output of the pressure transducer is connected to instrumentation for evaluating, comparing and displaying the air pressure and deviations of the air pressure from a known standard. Air is introduced from the supply line into selected ones of the fluid-carrying passages within the component undergoing test. The air is provided at a low pressure but at a high velocity. The back pressure of the air measured by the transducer within the supply line will vary according to the condition of the fluid-carrying passage within the component undergoing test. As used herein, the term "back pressure" refers to the change in pressure in the supply line as measured by the pitot tube due to the resistance to the flow of air caused by friction within the water passage under test. A related method disclosed herein provides for measuring the back pressure within the supply line for a component known to have acceptable fluid-carrying passages, i.e. a component whose fluid carrying passages are not blocked or otherwise restricted. The results of the test conducted on the good component are stored and the back pressure readings obtained from testing a component having fluid-carrying passages whose quality is not known are compared to the results obtained from the component known to have acceptable fluid-carrying passages. The results of the comparison provides an indication of whether the component undergoing test has any restrictions or other blockages within its fluid-carrying passages. The method and apparatus disclosed herein are insensitive to the temperature of the component undergoing test and the ambient atmospheric temperature which makes the apparatus and method particularly suited for use in an engine manufacturing factory.

BRIEF DESCRIPTION OF THE DRAWINGS

The above objects and other advantages of the invention will be appreciated after a review of the detailed description of a preferred embodiment when read in connection with the drawing in which.

DETAILED DESCRIPTION OF A PREFERRED EMBODIMENT

Figures 1, 2:
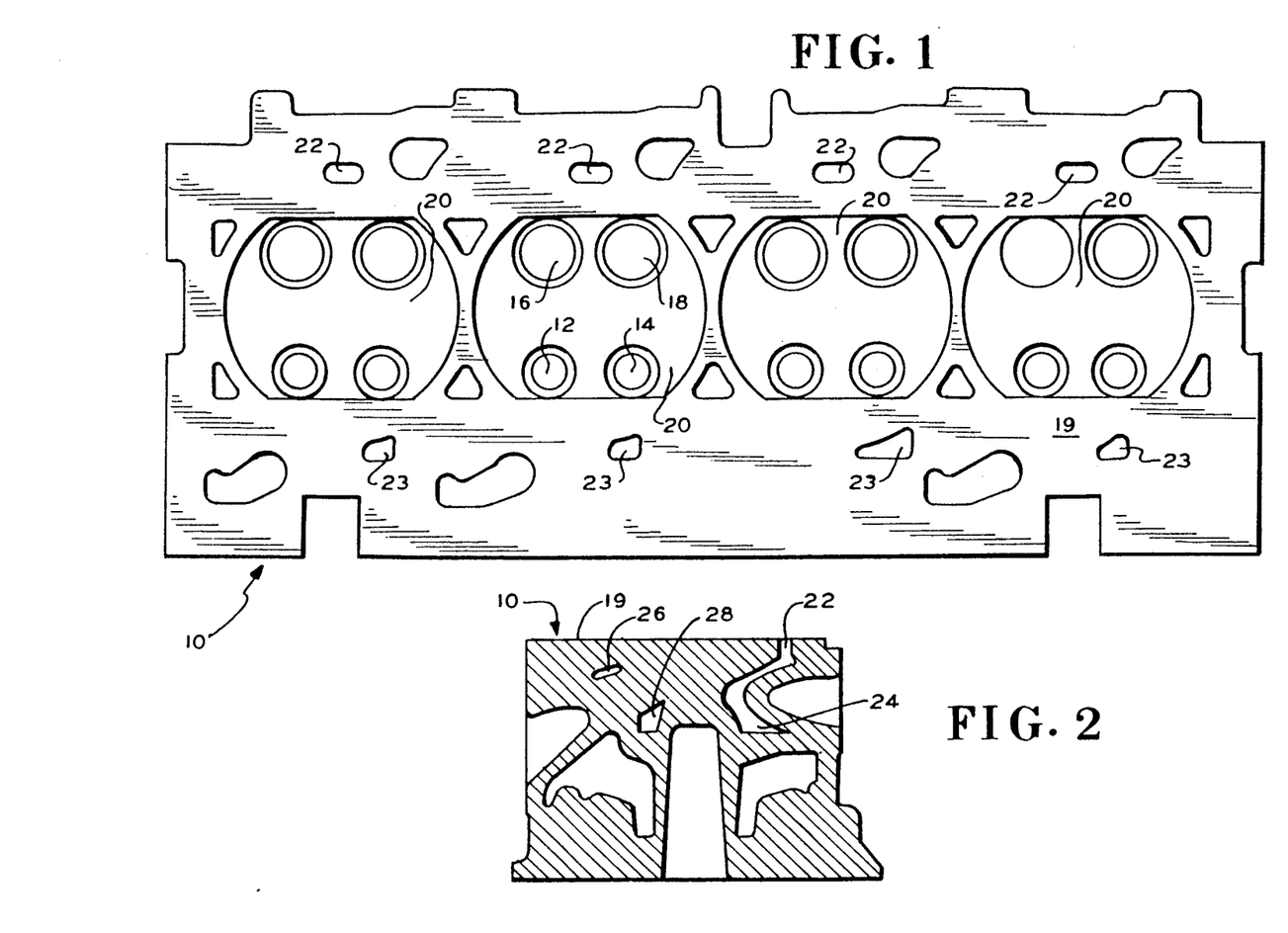
FIG. 1 is a top view of a cylinder head having coolant-carrying passages which may be tested utilizing the method and apparatus of the invention.
FIG. 2 is a section view through the cylinder head of FIG. 1 showing the internal details of water passages used to cool the cylinder head.

Referring to the drawing, FIG. 1 shows a cylinder head 10 designed for a four cylinder engine. The cylinder head 10 is a four-valve per cylinder design, having two intake valves 12 and 14 and two exhaust valves 16 and 18 per cylinder 20. While the preferred embodiment of the invention described herein is particularly adapted for the testing of cylinder heads for four cylinder engines, it is to be understood that the invention can be readily adapted to test cylinder heads for other types of engines, e.g. engines having six or eight cylinders, or other components having fluid-carrying passages. Cylinder head 10 has a machined upper surface 19 which contains water intake passages 22 and passages 23 through which water is discharged after circulating through cylinder head 10. FIG. 2 shows an arrangement of the cooling passages contained within the cylinder head 10 to permit cooling fluid, for example a mixture of water and ethylene glycol, to be circulated through the cylinder head 10. For example, cool water enters the cylinder head 10 through passage 22 and is circulated first around exhaust valves 16 and 18 (not shown in FIG. 2) then passes through passage 24 and is then circulated around intake valves 12 and 14 (not shown in FIG. 2) through passages 26 and 28 before being expelled from the cylinder head through passage 23 (not shown in FIG. 2). As used herein, all intake passages are numbered 22 and all passages through which water are expelled from the cylinder head are numbered 23. Water passages such as those shown at 22 and 23 in cylinder head 10 frequently have narrow channels through which cooling water must be pumped. If a blockage occurs in one or more of the channels, for example due to imperfections in the sand casting used in the molding process, a reduced coolant flow or, no coolant flow, might occur, with the result of unacceptably high localized heating occurring in the cylinder head 10.

Figure 3:
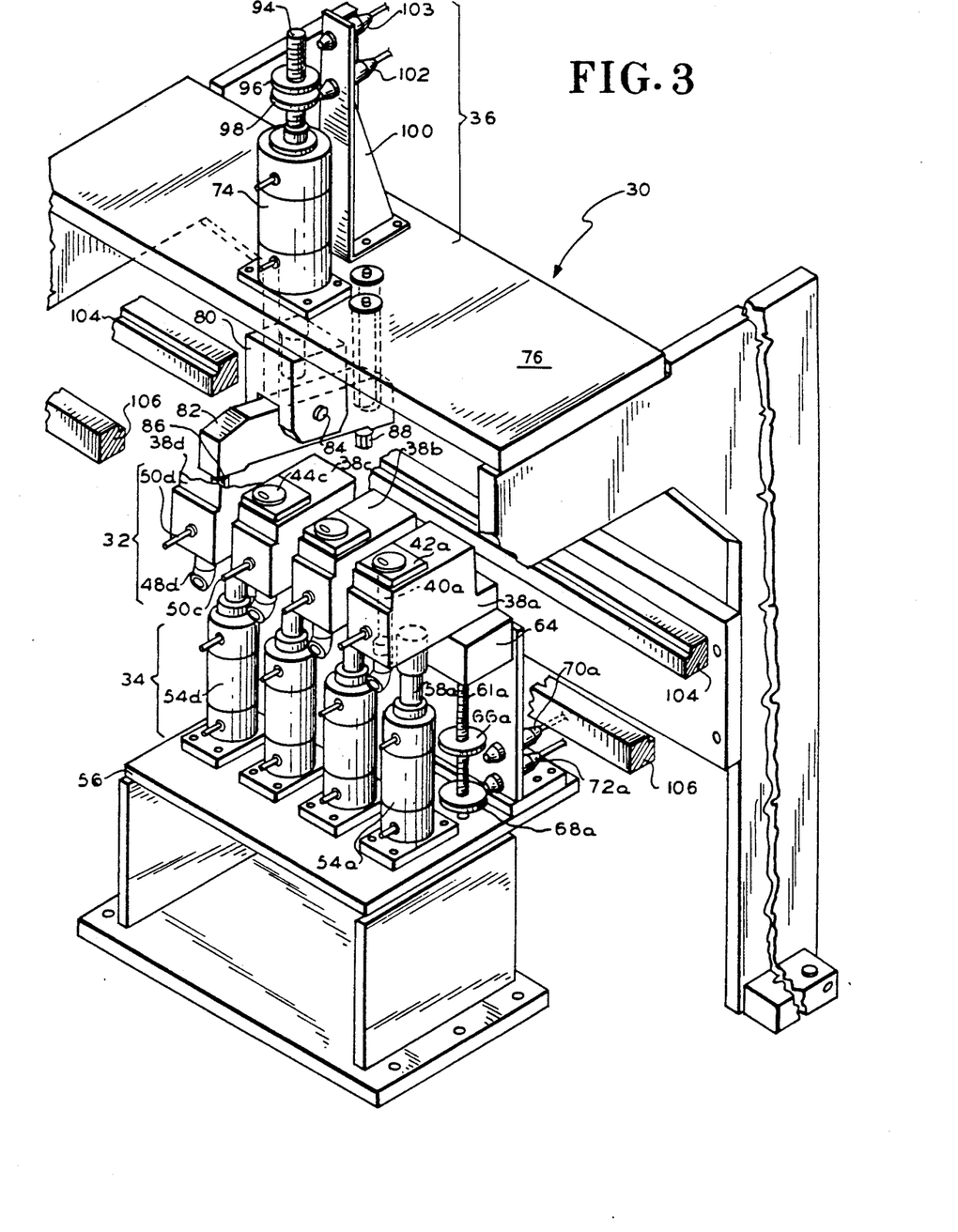
FIG. 3 is a perspective view showing a cylinder head flow test apparatus constructed according to the teachings of the invention which may be used for testing cylinder heads for four cylinder engines.

FIG. 3 discloses a preferred embodiment for a cylinder head flow test apparatus which is shown generally at 30. Apparatus 30 described herein is configured for testing cylinder heads for four cylinder engines. The cylinder head flow test apparatus 30 includes means 32 for introducing low pressure air at a high velocity into each cylinder head orifice under test; means 34 for moving each means for introducing low pressure air at a high velocity against the cylinder head in an ordered sequence; and means 36 for clamping the cylinder head to each means 32 for introducing low pressure air at a high velocity into the cylinder head orifice undergoing test. As noted above, the cylinder head flow test apparatus 30 shown and described herein is configured for testing four cylinder engine cylinder heads; where parts of the invention are common for testing each of the orifices in the cylinder head the reference numbers are designated with an a, b, c, or d subscript to differentiate those portions of the apparatus duplicated in the invention for purposes of testing a cylinder head having more than one orifice.

Figure 4:
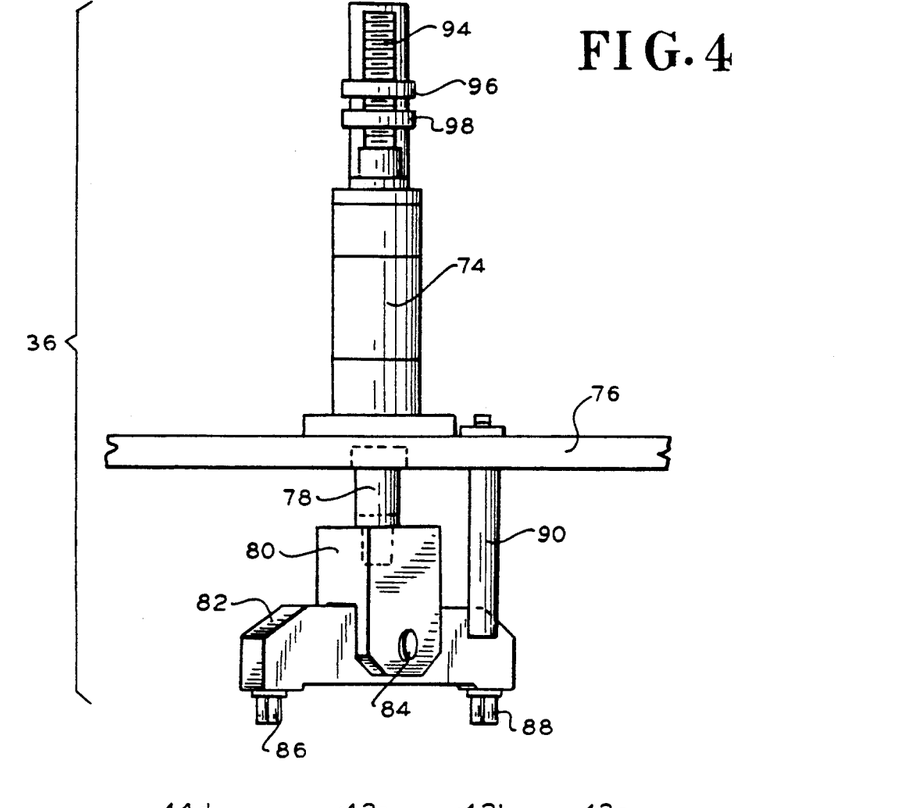
FIG. 4 is a front view of a portion of the apparatus of FIG. 3.
Figure 5:
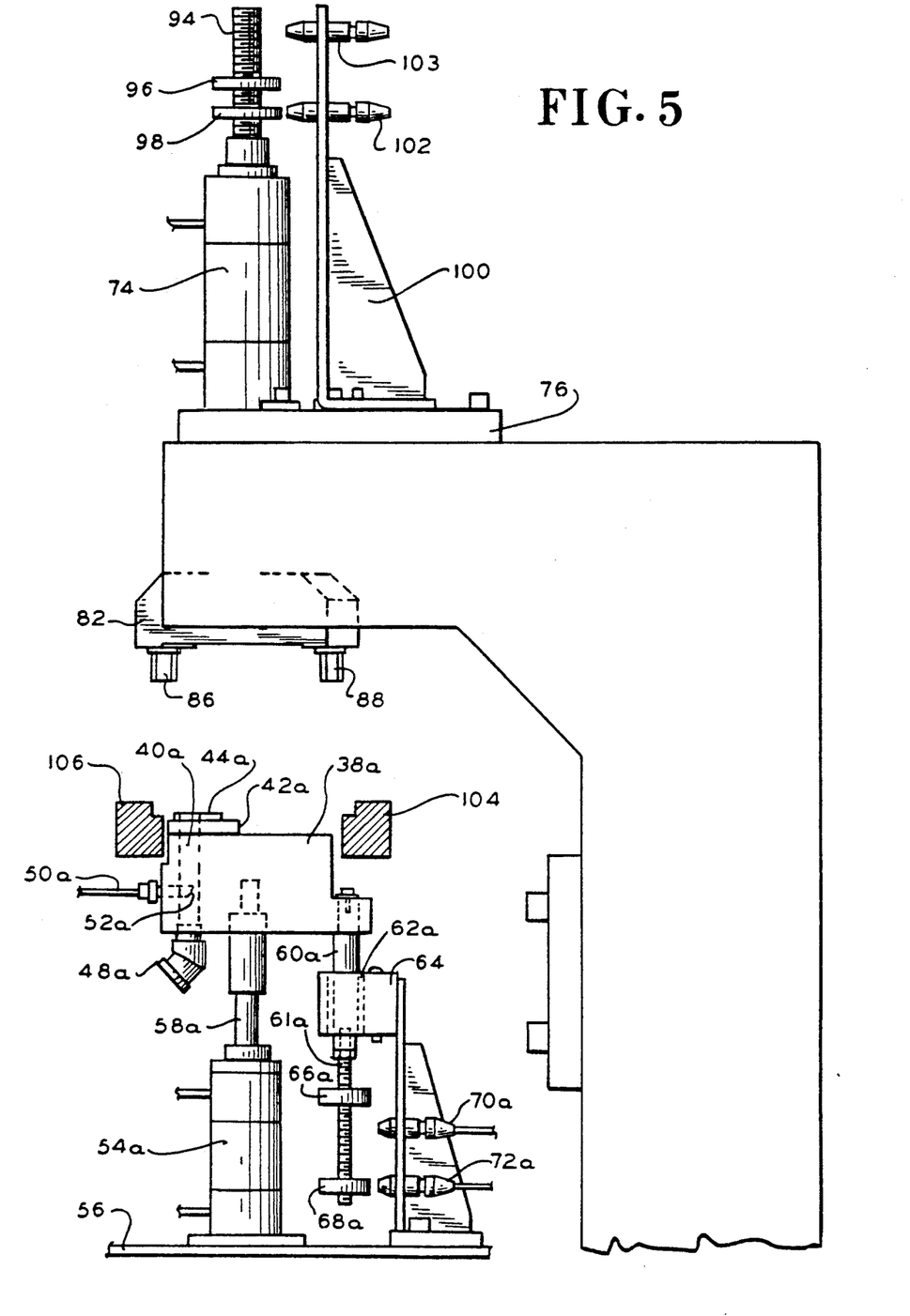
FIG. 5 is a side view of a portion of the apparatus of FIG. 3.

FIGS. 3-5 shows that means 32 for introducing low pressure air at a high velocity includes a block 38a having an air passage 40a passing therethrough. A pad 42a is fastened to the top of block 38a and includes an orifice contiguous with air passage 40a. Fastened to pad 42a is a sealing pad 44a having an aperture 46a. Sealing pad 44a is made of a resilient material, for example rubber or neoprene, to provide an air tight seal between the air passage 40a and passage in the cylinder block undergoing test and may, for example, be approximately ¼ inch thick. A coupling 48a is connected to the air passage 40a and is used to connect the block 38a to a source of low pressure air through hoses or tubing (not shown). Block 38a has passing therethrough into air passage 40a a pitot tube 50a having an end 52a positioned within air passage 40a to measure air pressure within passage 40a.

The means 34 for moving block 38a toward or away from a cylinder head undergoing test includes a hydraulic cylinder 54a having one end mounted to base plate 56 and a moveable piston 58a fastened to the lower end of block 38a. Hydraulic cylinder 54a is connected to a source of hydraulic fluid through control means which will be later described in detail. A rod 60a is connected to block 32a and passes through bushing 32 contained in stop block 64 to restrain any rotational movement of block 38a. Rod 60a has a lower extremity 61a which an upper metallic disc 66a and a lower metallic disc 68a fastened to it. Preferably rod 61a is threaded so that the position of upper disc 66a and lower disc 68a may be adjusted on rod 61a. Upstroke sensor 70a and down stroke sensor 72a preferably consist of proximity switches which may be actuated when upper disc 66a or lower disc 68a are moved to within contact range of upstroke sensor 70a or downstroke sensor 72b respectively. For example, upstroke sensor 70a or downstroke sensor 72b may consist of a Microswitch brand proximity sensor which operates on the Hall effect. Sensor 70a provides a signal when the means 32 for introducing low pressure air has been moved against a cylinder block 10 to permit air to be blown into the first set of water passages being tested. Subsequently, sensors 70b, 70c and 70d sequentially indicate when their respective means 32b-d have been moved into place against the other sets of water passages in the cylinder head and are ready for testing of other water passages to commence. Sensor 72a provides a signal when hydraulic cylinder 54a has returned block 38a to a lowered position after that portion of the test cycle for testing the first set of water passages has been completed. Thereafter, sensors 72b, 72c and 72d sequentially signal when respective blocks 38b, 38c and 38d have been moved away from a cylinder head being tested by hydraulic cylinders 54b, 54c and 54d respectively. The signals from sensors 70a-d and 72a-d are respectively applied to the tester 118 later described herein.

Figure 6:
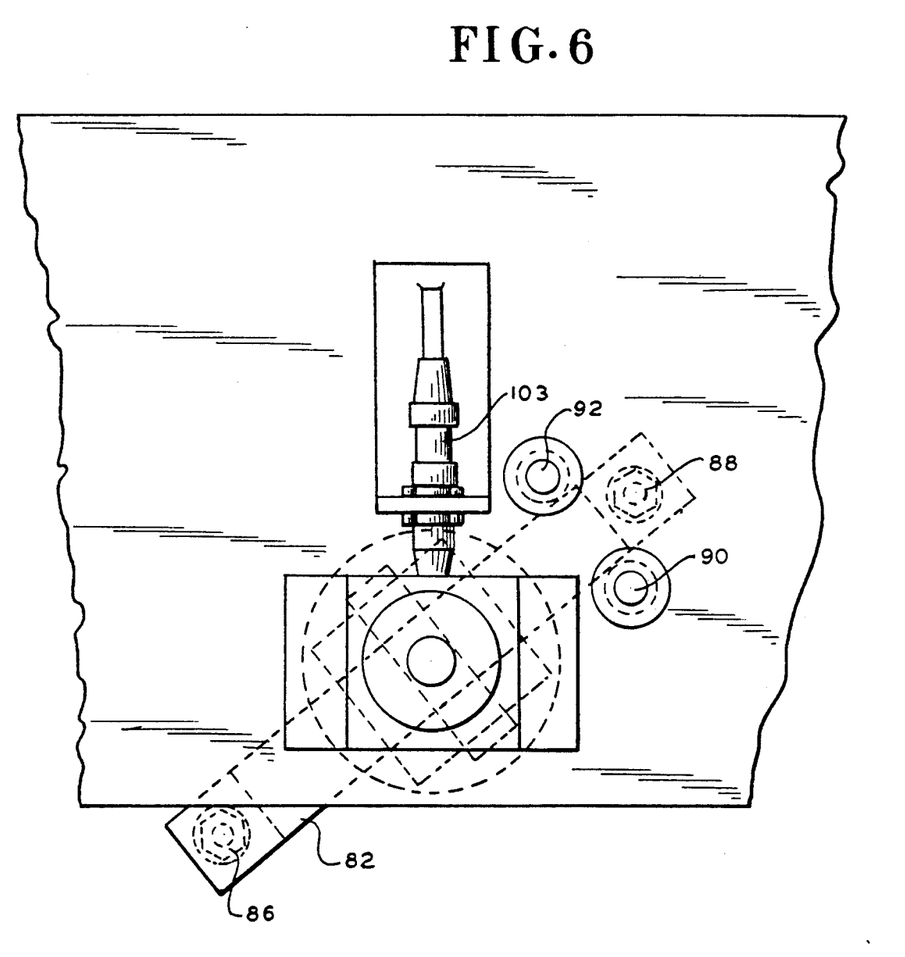
FIG. 6 is a top view of a mechanism used to clamp a cylinder head against the apparatus of the invention while flow tests are being conducted.
Figure 7:
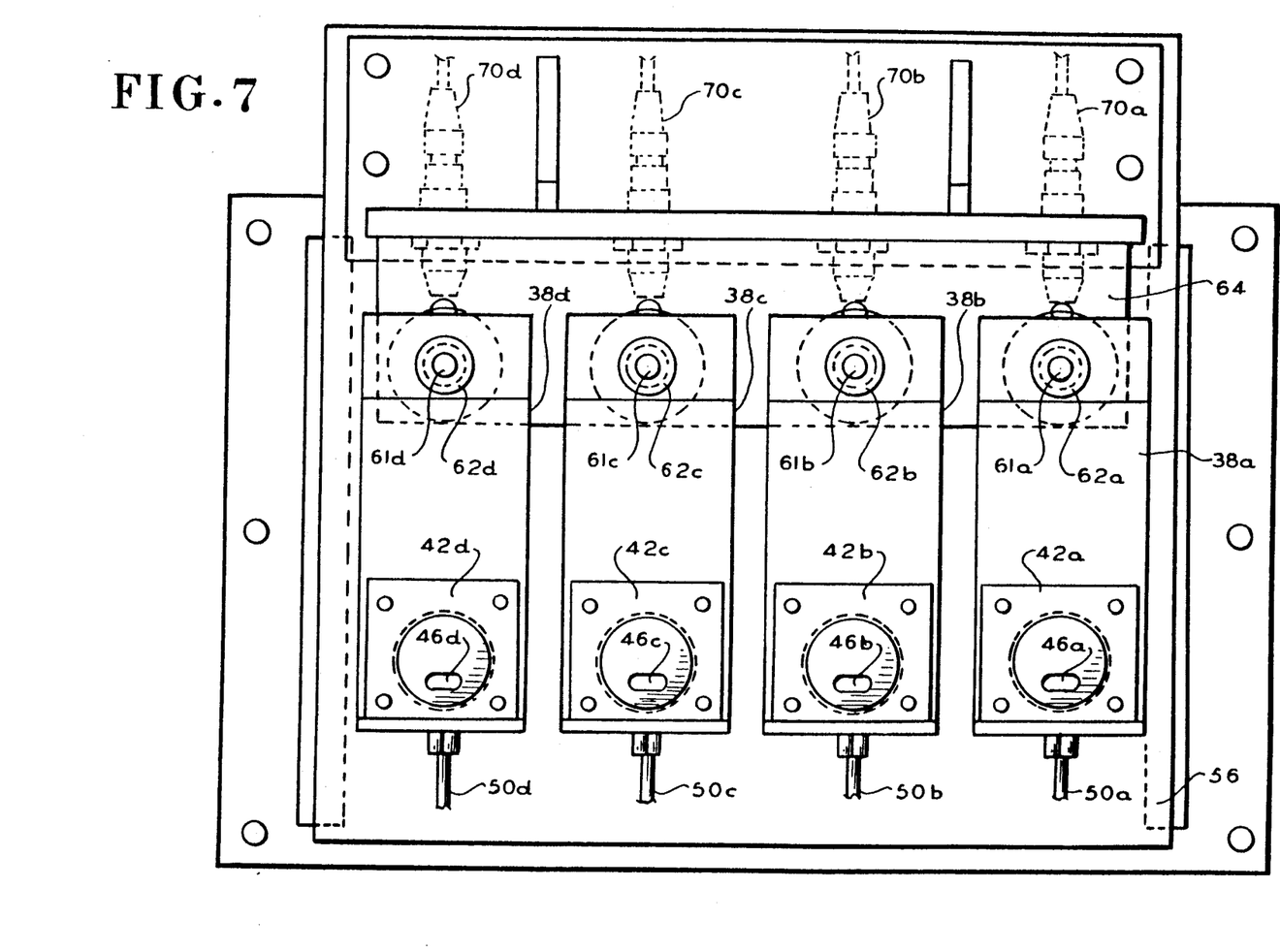
FIG. 7 is a top view of a portion of the apparatus of FIG. 3 showing details of construction of the means for clamping a cylinder head in the test apparatus.

Means 36 for clamping the cylinder head to the means for introducing low pressure air at high velocity into the orifices being tested includes hydraulic cylinder 74 which is rigidly fastened to a support 76. The lower end of hydraulic cylinder 74 includes a downward facing piston 78 which is fasted to a bracket 80 suspended below support 76 and which supports clamping bar 82 via pivot pin 84 to allow limited rotational motion of clamping bar 82 about the longitude axis of pivot pin 84. Clamping bar 82 includes a first clamping pin 86 and a second clamping pin 88 at opposite ends thereof. First clamping pin 86 and second clamping pin 88 are used to mate against pads (not shown) cast into the rear surface of the cylinder head to permit the clamping means 36 to restrain the cylinder head against the means 32 for introducing air into the orifices in the cylinder block. Pivot pin 84 allows for limited rotation of the clamping bar 82 to accommodate variations in the casting height of the pads cast into the cylinder head which are contacted by pins 86 and 88. Clamping means 36 also includes first and second anti-rotate pins 90 and 92 respectively to limit the motion of clamping bar 82 in a horizontal axis. The upper end of piston 78 includes a control rod 94 which has fastened thereto a pair of metallic discs, for example upper metallic disc 96 and lower metallic disc 98. A vertical bracket 100 is rigidly fastened to bracket 76 to hold a clampdown switch 102 and an unclamp switch 103 whose operation is similar to switches 70a and 72a and whose purpose is to signal the vertical position of the clamping bar 82. That is, a signal from switch 102 will indicate to tester 118 (later described) that a cylinder head is in position for testing, and a signal from switch 103 will indicate to tester 118 that a cylinder head is not being restrained by clamp means 36 for testing. Preferably control rod 94 is threaded so that the position of discs 96 and 98 may be readily adjusted relative to clampdown switch 102 and unclamp switch 103. Hydraulic cylinder 74 is connected to a source of hydraulic fluid which may be selectively applied to cylinder 74.

FIG. 5 shows that a pair of rigid rails 104 and 106 are spaced apart and are positioned relative to means 32 and below clamping means 36 to permit a cylinder head (not shown in FIG. 5) to be slid into position within test apparatus 30. While a cylinder head may be manually slid along rails 104 and 106 to place it into position above the test apparatus, in an automated environmental, an arrangement using a mechanically driven mechanism, such as a chain, having dogs which engage the cylinder head to move it along rails 104 and 106 would be employed. While a mechanism for moving the cylinder head along the rails is not shown, many suitable arrangements for such a device will be readily apparent to those skilled in the art.

Figure 8:
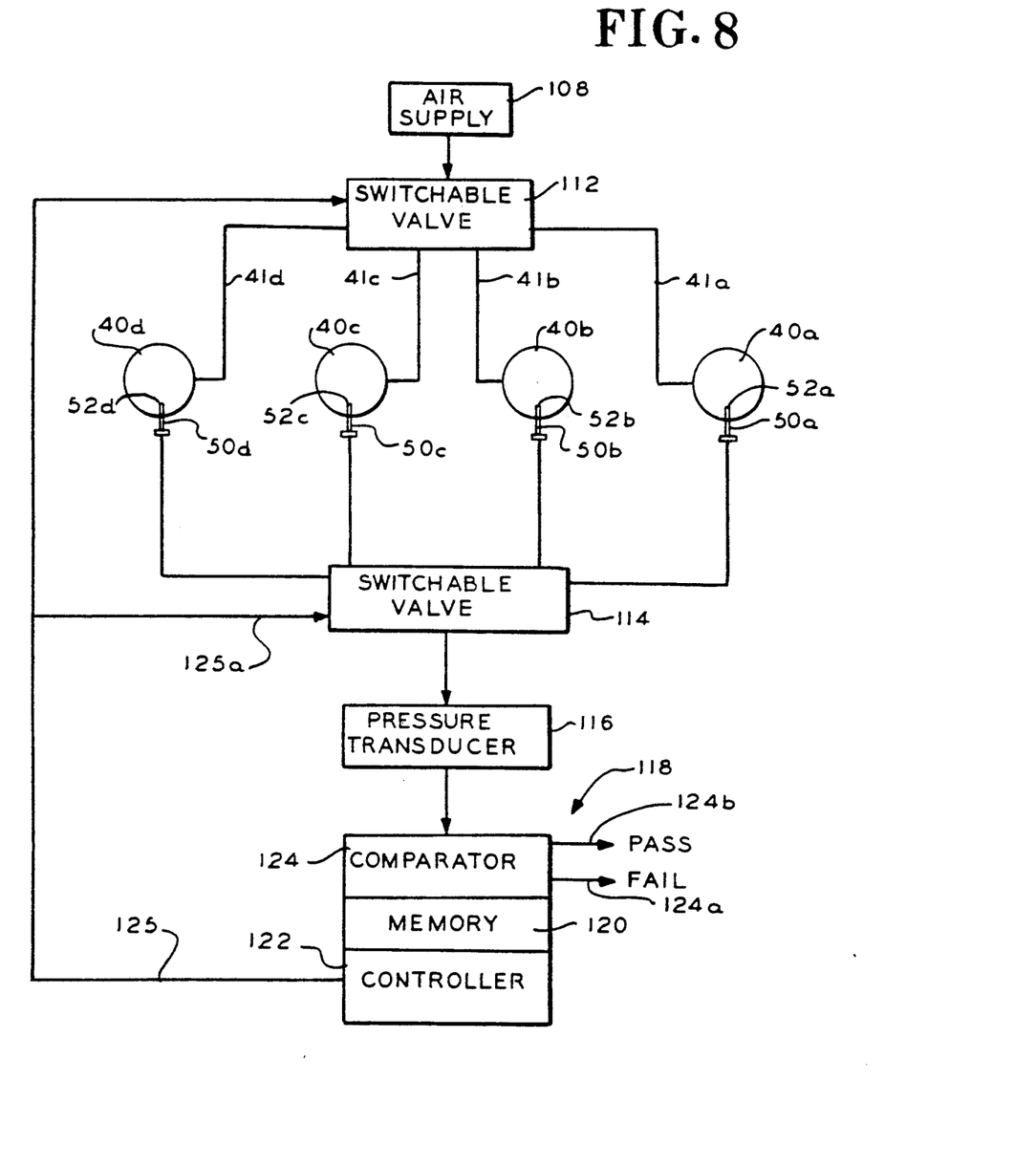
FIG. 8 is a block diagram showing a pictorial representation of the control mechanism used to control the apparatus of FIG. 3.

FIG. 8 is a schematic representation showing the elements used to selectively control operation of the test apparatus 30 and for collecting data representative of the condition of water passages within a cylinder head undergoing test. An air supply 108, for example supplied from a compressor to an accumulator tank with a regulator (not shown) to regulate the pressure and velocity of the supply air in a manner well known in the art, is connected via a supply line to a switchable valve 112, for example a model no. 8210854 valve manufactured by ASCO, to selectively direct air from the air supply into the passages 40a, 40b, 40c, or 40d. As used herein, it is to be understood that the air supply 108 provides air at a pressure of approximately 20 psi through a ¾ inch line to each of the passages 40a-d. FIG. 8 also shows that the output of each pitot tube 50a, 50b, 50c, and 50d is connected via an air hose or line to a switchable valve 114 which may be a NO. V52LA2100 model valve manufactured by the Skinner Company. The purpose of valve 114 is to selectively direct air from the appropriate pitot tube 50a, 50b, 50c, or 50d into a pressure transducer 116, thereby eliminating the need for multiple pressure transducers for each pitot tube 50a-d and further insuring that the output of each pitot tube is uniformly converted into an electrical signal by eliminating the use of multiple transducers which might possibly have different electrical output characteristics. Pressure transducer 116 may for example be a Rosemount model no. 20240 transducer. Pressure transducer 116 converts the back pressure reading measured by each pitot tube 50a-d within its appropriate air passage 40a-d into an electrical signal which may be fed to a tester 118, for example a general purpose computer, or a tester made for industrial applications such as the Model 4000 Series Testers manufactured by Uson Corporation.

Tester 118 may for example include a memory section 120, a controller section 122, and a comparator section 124. Memory 120 may for example be an electrically erasable program read-only memory (EEPROM) which is a non-volatile memory that can be programmed to record the back pressure readings obtained from pressure transducer 116 when a cylinder head 10 known to have acceptable water passages (that is, water passages that are not blocked or otherwise restricted or while known to have restrictions is still acceptable because of the minor nature of the restrictions) is subject to the testing process using the tester 30 described herein. Comparator 124 is used to compare the reading obtained by pressure transducer 116 from the successive testing of each of the water passages contained in the cylinder head 10 against the readings stored in memory 120. Memory 124 is programmed with data indicative of an acceptable back pressure threshold for each reading obtained by the apparatus 30 when an acceptable cylinder head is tested. If the results of the testing shows that the back pressure is below the threshold level stored in memory 120, then the cylinder head is rejected and comparator 124 provides a reject signal on line 124a. If the output of pressure transducer 116 shows that the back pressure is at least equal to the results stored in memory 120 from testing a good cylinder head 10, or if the results fall within the acceptable range stored within the memory 120, then comparator 124 provides a signal on line 124b indicative of an acceptable cylinder head. Outputs 124a and 124b from comparator 124 may be used to selectively control apparatus to remove a cylinder head having unacceptable water passages from the assembly line, or to produce a visual indication to an operator indicative of whether the cylinder head undergoing test is acceptable or has been rejected.

Controller 122 is used to control the test cycle for the tester 30. For example, controller 122 can initiate the test cycle by selectively energizing hydraulic cylinders 54a, 54b, 54c, or 54d to raise blocks 38a, 38b, 38c, or 38d against the cylinder block 10 undergoing test and by energizing hydraulic cylinder 74 to clamp the cylinder head against rails 104 and 106. Signals from switches 102 and 103 indicate to controller 122 the status of clamp means 36, that is, whether the clamping bar 82 is holding a cylinder head in the test position over means 32. Controller 122 also provides a signal on line 125 to cause switchable valve 112 to selectively supply air from air supply 108 through air supply line 41a, 41b, 41c or 41d to that water passage or set of water passages in the cylinder block 10 undergoing test. Controller 122 also provides a signal on line 125a to switchable valve 114 which switches the pressure transducer 116 to receive back pressure information from the appropriate pitot tube 50a, 50b, 50c, or 50d. A complete test cycle may be sequentially coordinated by controller 122 so that after the first set of water passages in cylinder head 10 have been tested, for example utilizing those elements of the tester 30 connected to air passage 40a, data is sequentially obtained and analyzed for water passages tested using air passages 40b, 40c, and 40d.

Using a tester 30 constructed in accordance with the teachings of FIGS. 3-8, a test of the water passages contained in a cylinder head for a four cylinder engine can be accomplished in approximately fourteen seconds from the time that the cylinder head is first placed in position over the tester 30. In particular, once each block 38a-d is moved against the cylinder head to compress pads 48a-d against the face of the cylinder head, air is blown into the air passages within the cylinder head for approximately two and a half seconds for each chamber undergoing test. Using a supply of air having a pressure of 20 psi, a cylinder head for 1.6 liter four valve per cylinder, four cylinder engine was tested. It was determined that a cylinder head having no blockages in the water passages produced a back pressure reading at each pitot tube 50a-d of approximately 127 to 131 inches of water. When a cylinder head was measured having blockages of approximately fifty percent in one or more of the water passages, it was found that the pitot tubes measured a reading of 140-141 inches of water.

Figure 9:
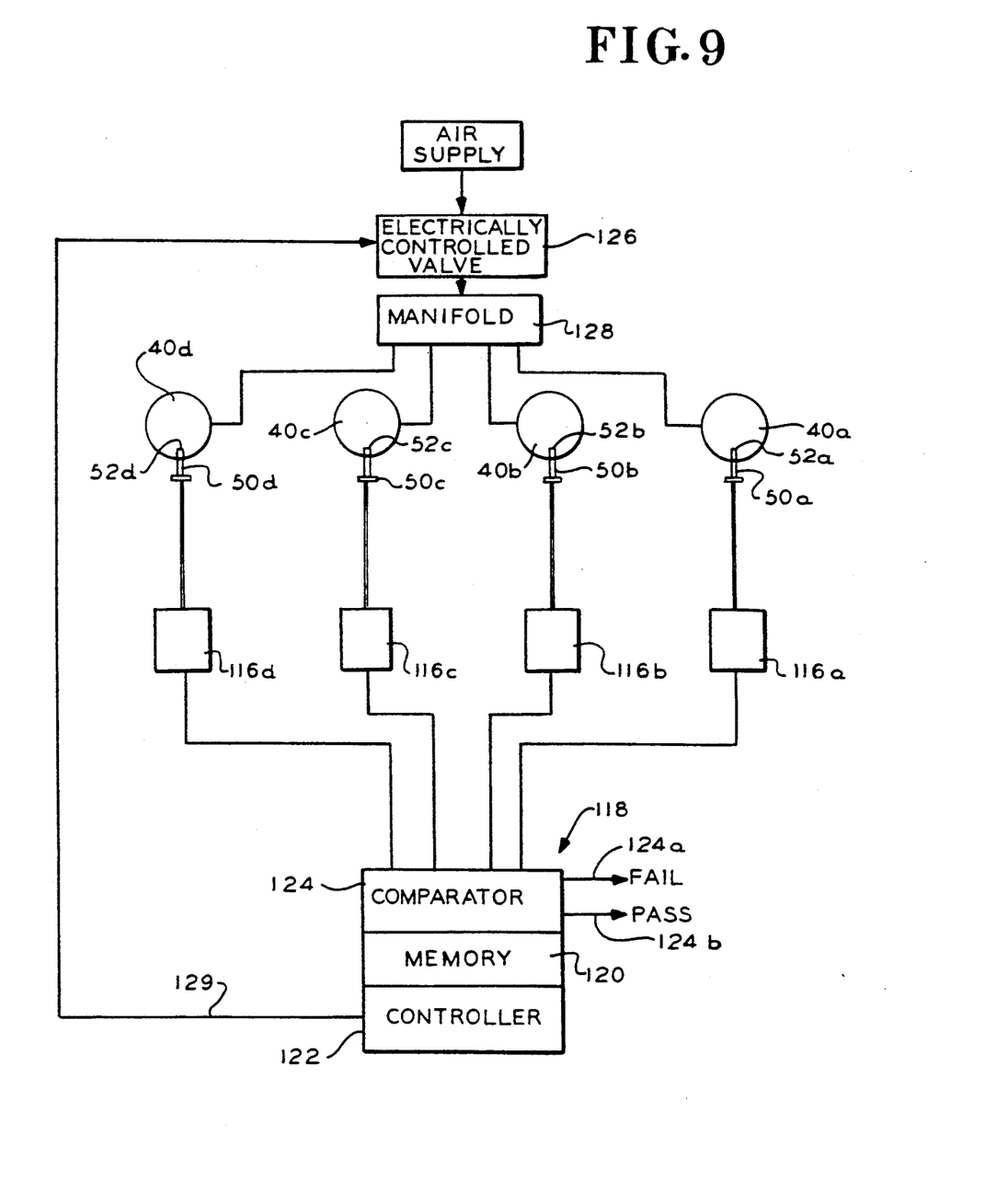
FIG. 9 is a block diagram showing a pictorial representation of a control mechanism for an alternate embodiment of the invention.

FIG. 9 is a schematic block diagram of an alternate embodiment of the invention which may be used to simultaneously obtain back pressure readings from all water passages in a cylinder head 10. Elements appearing in FIG. 9 which are common to FIG. 8 are labeled with the same reference numbers. The arrangement disclosed in FIG. 9 includes a set of four pressure transducers 116a, 116b, 116c and 116d. Each of the pressure transducers 116a-d are connected to a respective pitot tube 50a-d and the electrical output of the pressure transducers 116a-d are supplied to the tester 118. An electrically controlled valve 126 is connected between air supply 112 and a manifold 128. Manifold 128 simultaneously provides low pressure air at a high velocity to each of the air passages 40a-d. Valve 126 is used to selectively connect the output of air supply 112 to manifold 128 by providing a signal from controller 122 over line 129. Controller 122 also simultaneously controls the operation of hydraulic cylinders 54a-d. Because each pitot tube 50a-d has its own pressure transducer 116a-d to monitor back pressure at the tip of each pitot tube, the need for switchable valve 114 (FIG. 8) is eliminated. In the case of the configuration shown in FIG. 9, tester 118 is arranged to simultaneously monitor the electrical outputs of pressure transducers 116a-d. For example, the outputs of transducers 116a-d may be temporarily stored in a memory, for example a portion of memory 120, and then the readings from each pressure transducer 116a-d may be compared either in sequence or simultaneously to the readings obtained by the pressure transducers 116a-d during the testing of a cylinder head 10 having water passages without any blockages or with limited blockages which do not render the cylinder head unacceptable. As in the case of the embodiment shown in FIG. 8, the results of the testing may be used to provide an indication of whether the cylinder head has one or more water passages containing blockages and to provide an indication of whether the restrictions in the water passages still make the cylinder head acceptable.

As is evident from the foregoing detailed description of a preferred embodiment, numerous modifications can be made to the invention without departing from the scope and spirit of the invention. Furthermore, while the invention has been particularly described as being applicable to the testing of engine components in general, and cylinder heads in particular, it would be obvious to those skilled in the art that the method and apparatus disclosed herein could be used for many other testing purposes, for example, testing water passages in engine blocks or exhaust manifolds for blockages. The preferred embodiment of the flow test apparatus and method described herein are provided for purposes of illustration and are not intended to indicate limits of the invention, the scope of which is defined by the following claims:

We claim:

1. A method for testing a cylinder head having a plurality of water passages for conducting coolant water through said cylinder head, comprised of:
   a. selectively connecting one or more of said water passages in said cylinder head to a supply line to introduce a supply of low pressure air at a high velocity into said water passages;
   b. providing a pitot tube in said supply line;
   c. connecting said pitot tube to a pressure transducer to selectively read the back pressure at the point where said supply line is connected to said one or more water cavities; and
   d. monitoring the output of said pressure transducer, whereby the back pressure of the air introduced into one or more of said water cavities measured by said pressure transducer provides an indication of the presence of restrictions in said one or more water passages.

2. The method set forth in claim 1 further including the steps of:
   a. measuring the back pressure in water passages of a cylinder head known to have no restriction; and
   b. comparing the back pressure readings in a cylinder head being tested to those back pressure readings measured in a cylinder head having water passages with no restrictions.

3. The method of claim 2 further including steps of:
   a. providing multiple supply lines to simultaneously introduce a supply of low pressure air at a high velocity to more than one water passage in said cylinder head;
   b. providing a pitot tube in each of said supply lines, each of said pitot tubes being connected to a pressure transducer to selectively read the back pressure at the point where said supply line is connected to said water cavities; and
   c. recording the reading of the pressure transducers in each of said supply lines to provide an indication of the presence of restrictions in one or more of said water passages.

4. The method set forth in claim 3 whereby the percent of restriction in a water cavity undergoing test is determined by comparing the reading of the pressure transducer monitoring the back pressure in a water passage undergoing test to the back pressure reading obtained from a pressure transducer monitoring the back pressure in the same water passage in a cylinder head known to have no defects in the water passages.

5. An apparatus for testing for blockages in the water passages in an engine cylinder head comprised of:

a. means for supplying a volume of low pressure air to one or more of said water cavities;

b. means for monitoring the back pressure of the air supplied to one or more of said water passages; and c. means for comparing the back pressure of air in said one or more water passages in a cylinder head undergoing test to the back pressure readings obtained from testing equivalent water passages in a cylinder head known to have no blockages within said water passages undergoing test.

6. The mechanism set forth in claim 5 wherein the means for monitoring the back pressure in said supply line is a pressure transducer.

7. The mechanism set forth in claim 6 further comprising a pitot tube extending into said air supply line and connected to said pressure transducer, said pitot tube being positioned within said supply line to measure changes in the back pressure in the water passage undergoing test.

8. The mechanism set forth in claim 7 further including means for comparing the back pressure readings obtained from each of said water passages to back pressure readings obtained from water passages in a cylinder head known to have no blockages in any of said water passages.

9. The mechanism set forth in claim 8 further including means for storing the results of said comparison between the back pressure readings obtained for water passages in the cylinder head undergoing test and the back pressure readings obtained for water passages in a cylinder head known to have no blockages in said water passages.

10. The mechanism set forth in claim 9 where in said air supply introduces air into said water passages undergoing test at a high velocity.

11. A method for testing for blockages in the water passages in a cylinder head comprising the steps of:

a. blowing low pressure air at a high velocity into the water passages;

b. measuring the back pressure produced by the low pressure air blown into the water passages caused by blockages in the water passages; and c. comparing the back pressure reading obtained for the water passages in the cylinder head undergoing test to the back pressure readings obtained by blowing low pressure air at high velocity into the water passages of a cylinder head known to have no blockages.

12. The method of claim 11 further including means for selectively testing one or more of the water passages in a cylinder head.

13. The method set forth in claim 12 further including means for intermittently clamping the means for selectively blowing low pressure air at a high velocity into each water passage against the cylinder head.

14. The method set forth in claim 13 wherein the back pressure readings for each water passage are converted into an electrical signal and the electrical signal is compared to electrical signals representing the back pressure readings obtained from testing a cylinder head having water passages known to contain no blockages.

15. The method set forth in claim 14 wherein the back pressure readings are obtained for each of a plurality of sets of water passages contained in the cylinder head.

16. An apparatus for testing for blockages in the water passages in a cylinder head for an internal combustion engine comprised of:

a. a plurality of means selectively moveable against said cylinder head to provide a source of low pressure air at a high velocity to the water passages in said cylinder head;

b. means for moving said means for providing a source of low pressure air against said cylinder head; and c. means for comparing the back pressure produced when air is blown from said means for providing a source of low pressure air into the water passages in a cylinder head under test to the back pressure produced when air is blown from said source of low pressure air at a high velocity into the water passages of a cylinder head known to have no blockages.

17. The apparatus set forth in claim 16 wherein the means for measuring the back pressure is comprised of a pitot tube located at least partially within said means for providing a source of low pressure air at high velocity.

18. The apparatus set forth in claim 17 further including means for converting the back pressure reading of each of said pitot tubes into an electrical signal, said electrical signal being indicative of the presence of blockages within said water passages in said cylinder head.

19. The apparatus set forth in claim 18 further including control means for automatically moving one or more of said means for providing a source of low pressure air to the cylinder head in an ordered sequence.

20. The apparatus set forth in claim 19 further including means for clamping the cylinder had against the means for providing a source of low pressure air.

21. An apparatus for testing for blockages in the water passages in the cylinder head of an internal combustion engine, said cylinder head having a face and a plurality of water inlet passages on the face of the cylinder head for conducting water into said water passages, said apparatus being comprised of:

a. a pair of parallel rails for holding said cylinder head with said water inlet passages accessible between said rails;

b. means spaced apart from said rails for holding said cylinder head against said rails;

c. means moveable against the face of said cylinder head for providing a source of low pressure air at a high velocity to each of said water inlet passages;

d. means for moving each of said sources of low pressure air against the face of said cylinder head; and e. means for measuring the back pressure produced in each of the means for providing a source of low pressure air when air is blown into each of said inlet passages from said means for providing a source of low pressure air.

22. The apparatus set for the in claim 21 wherein said means for providing a source of low pressure air further include a resilient seal positioned between said means for producing a source of low pressure air and the face of said cylinder head containing said water inlet passages.

23. The apparatus set forth in claim 22 wherein each of the means for providing a source of low pressure air at a high velocity are moved against the face of said cylinder head containing water inlet passages by a hydraulically operated cylinder.

24. The apparatus set forth in claim 23 wherein each of said means for providing a low pressure source of air at a high velocity are located between said parallel rails.

25. The apparatus set forth in claim 24 further including a hydraulically operated piston for intermittently holding said cylinder head against said rails while each of said means for providing a source of low pressure air are moved against the cylinder head.

26. The apparatus set forth in claim 25 wherein the means for measuring the back pressure is located at least partially within each of the means for providing a source of low pressure air.

27. The apparatus set forth in claim 26 wherein the means for measuring the back pressure is a pitot tube having an open end.

28. The apparatus set forth in claim 27 further including a pressure transducer connected to said pitot tube, said pressure transducer producing an electrical signal indicative of the back pressure measured by said pitot tube.

29. The apparatus set forth in claim 28 further including a controller for controlling movement of said means for providing a source of low pressure air against the face of said cylinder head and the movement of said hydraulically operated piston for intermittently holding said cylinder head against said rails.

30. The apparatus set forth in claim 29 further including a separate means for providing a source of low pressure air for each water inlet passage on the face of the cylinder head, each of said means for providing a source of low pressure air being connected to a means for moving each of said sources of low pressure air against the face of the cylinder head to permit each of said means for providing a source of low pressure air to be independently moved against the face of the cylinder head under the direction of the controller.

31. The apparatus set forth in claim 30 wherein each of said means for moving each of said sources of low pressure air against the face of the cylinder head are simultaneously moved against the face of said cylinder head by the controller.

* * * * *